US008146700B2

(12) United States Patent
Rousseau

(10) Patent No.: US 8,146,700 B2
(45) Date of Patent: Apr. 3, 2012

(54) SKID STEER LOADER AND MOUNTING METHOD

(75) Inventor: Paul A. Rousseau, Raleigh, NC (US)

(73) Assignee: Caterpillar Inc., Peoria, IL (US)

(*) Notice: Subject to any disclaimer, the term of this patent is extended or adjusted under 35 U.S.C. 154(b) by 602 days.

(21) Appl. No.: 12/314,751

(22) Filed: Dec. 16, 2008

(65) Prior Publication Data

US 2010/0147631 A1 Jun. 17, 2010

(51) Int. Cl.
*B60K 17/342* (2006.01)
*B60K 17/00* (2006.01)

(52) U.S. Cl. .......................... 180/242; 180/246; 180/307

(58) Field of Classification Search .................... 180/58, 180/291, 292, 294, 298, 299, 307, 308, 309, 180/242, 246; 074/606 R, 665 GE
See application file for complete search history.

(56) References Cited

U.S. PATENT DOCUMENTS

| | | | | |
|---|---|---|---|---|
| 1,743,612 | A * | 1/1930 | Lee | 180/291 |
| 1,939,848 | A | 12/1933 | Haushalter | |
| 2,182,789 | A * | 12/1939 | Cotanch | 74/411 |
| 2,188,807 | A | 1/1940 | Castricone | |
| 2,209,477 | A * | 7/1940 | Reibel | 248/606 |
| 2,498,126 | A | 2/1950 | Koch | |
| 2,588,866 | A * | 3/1952 | Moon | 60/389 |
| 3,810,517 | A * | 5/1974 | Hurlburt et al. | 180/246 |
| 3,883,099 | A | 5/1975 | Hermann et al. | |
| 4,086,785 | A | 5/1978 | Kochendorfer et al. | |
| 4,154,417 | A | 5/1979 | Foley, Jr. | |
| 4,884,779 | A | 12/1989 | Dräbing et al. | |
| 4,962,821 | A * | 10/1990 | Kim | 180/6.48 |
| 5,044,598 | A | 9/1991 | Mann et al. | |
| 6,003,625 | A * | 12/1999 | Neuling | 180/11 |
| 6,650,985 | B2 | 11/2003 | Lin et al. | |
| 7,108,098 | B2 * | 9/2006 | Reese et al. | 180/299 |
| 7,419,028 | B2 * | 9/2008 | Yamakura et al. | 180/291 |
| 7,614,473 | B2 * | 11/2009 | Ono et al. | 180/299 |
| 2005/0051686 | A1 | 3/2005 | Payne | |
| 2008/0264054 | A1 * | 10/2008 | Rousseau et al. | 60/484 |

FOREIGN PATENT DOCUMENTS

JP 05338445 A * 12/1993

OTHER PUBLICATIONS

U.S. Appl. No. 11/888,972, filed Aug. 3, 2007 (13 pages).

* cited by examiner

*Primary Examiner* — John R Olszewski
(74) *Attorney, Agent, or Firm* — Finnegan, Henderson, Farabow, Garrett & Dunner LLP

(57) ABSTRACT

A mounting method for a skid steer loader is disclosed including coupling a first end portion of a component directly to a first wall of a skid steer loader frame. The method also includes coupling a second end portion of the component to an opposite wall of the skid steer loader frame by a mounting system that allows for dimensional differences between the component and the skid steer loader frame.

17 Claims, 4 Drawing Sheets

SKID STEER LOADER AND MOUNTING METHOD

TECHNICAL FIELD

The present disclosure is directed to a skid steer loader and, more particularly, to a mounting method for a skid steer loader.

BACKGROUND

Machines such as, for example, skid steer loaders may be used for a variety of tasks such as heavy construction and mining. These machines may include a structural frame where certain drive system components such as, for example, an assembly that includes hydraulic pumpmotors, may be mounted within the structural frame. The drive system components typically have substantially constant dimensions, while the structural frame typically has varying dimensions.

One shortcoming of mounting such drive components to the structural frames involves the varying dimensions of the frames. For example, the dimensions extending across skid steer loader frames typically vary from skid steer loader to skid steer loader, based on variations during manufacturing. The dimensions of the skid steer drive components typically remain substantially constant. As a result, the drive components having constant dimensions may not match and fit precisely within the frames that have dimensions that vary from skid steer loader to skid steer loader. This mismatch may cause the frame to become distorted when the assembly is mounted.

An exemplary skid steer loader is described in U.S. Pat. No. 4,962,821 (the '821 patent), issued to Kim on Oct. 16, 1990. The '821 patent discloses a main frame including first and second side beams that are fixed to a base of the main frame by welding. The '821 patent discloses engine system components that are mounted between the first and second side beams.

Although machine components may be mounted between the main frame of the skid steer loader, the '821 patent fails to account for a mismatch between a mounted assembly having constant dimensions and machine frames having dimensions that vary from skid steer loader to skid steer loader. Because the side beams of the '821 patent are fixed to the base of the frame, they may not be adjusted to accommodate a mismatch between a mounted assembly dimension and a machine frame dimension. As a result, additional assembly time may be required to mount the assembly and/or the machine frame may become distorted when the assembly is mounted.

The present disclosure is directed to overcoming one or more of the shortcomings set forth above and/or other deficiencies in existing technology.

SUMMARY OF THE DISCLOSURE

In accordance with one aspect, the present disclosure is directed toward a mounting method for a skid steer loader. The method includes coupling a first end portion of a component directly to a first wall of a skid steer loader frame. The method also includes coupling a second end portion of the component to an opposite wall of the skid steer loader frame by a mounting system that allows for dimensional differences between the component and the skid steer loader frame.

According to another aspect, the present disclosure is directed toward a skid steer loader. The skid steer loader includes a frame having a first wall and an opposite wall, and a first distance between the first and opposite walls. The skid steer loader also includes a component extending between the first and opposite walls of the skid steer loader frame, the component having a first end portion and a second end portion, and a second distance between the first end portion and the second end portion. The second distance is different than the first distance. The skid steer loader further includes a fixed coupling connecting the first end portion to the first wall and a variable coupling connecting the second end portion to the opposite wall.

DETAILED DESCRIPTION

Figure 1:
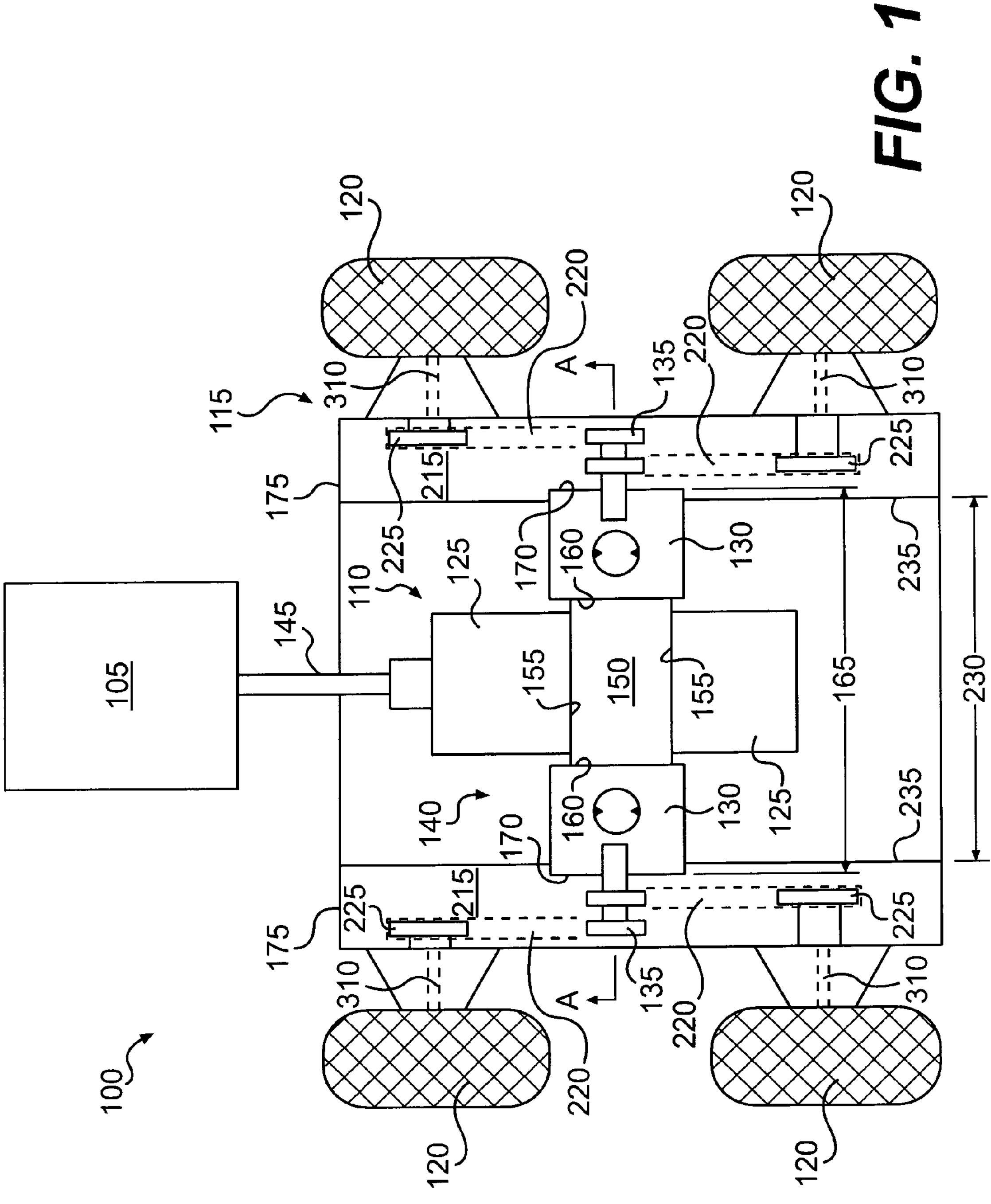
FIG. 1 is a schematic illustration of an exemplary disclosed machine.

FIG. 1 illustrates an exemplary disclosed machine 100 that may be a skid steer loader. Machine 100 may include a power source 105, a transmission 110, a frame 115, and one or more traction devices 120. Transmission 110 may be mounted on frame 115, and may transfer power from power source 105 to drive traction devices 120.

Power source 105 may produce a mechanical power output and embody an internal combustion engine such as, for example, a diesel engine, a gasoline engine, a gaseous fuel-powered engine, or any other type of engine apparent to one skilled in the art. Power source 105 may, alternatively, embody a non-combustion source of power such as a battery, a fuel cell, a motor, or any other suitable source of power.

Figure 2:
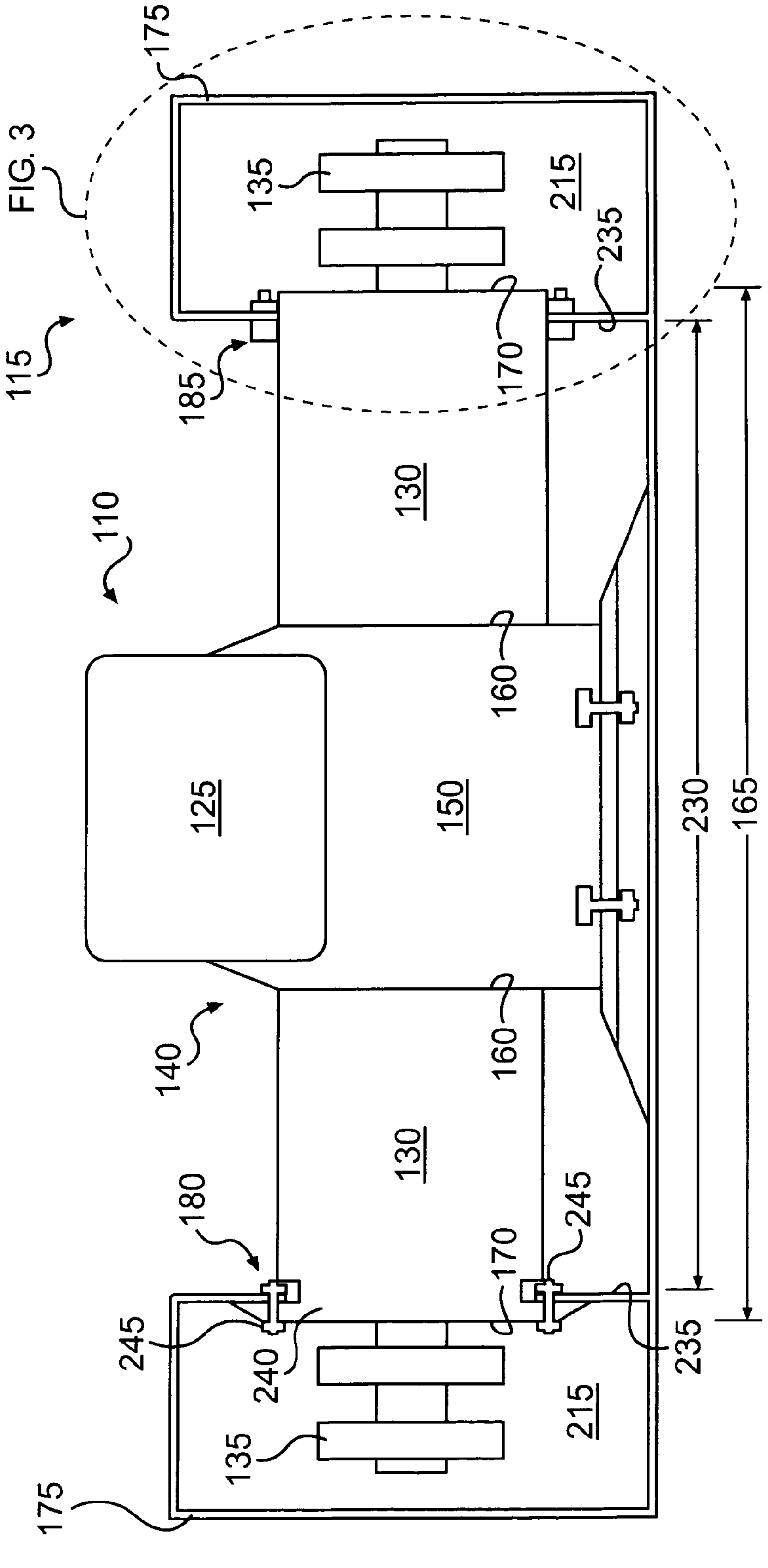
FIG. 2 is a cross-sectional illustration of the machine of FIG. 1, viewed along line A-A.

As illustrated in FIGS. 1 and 2, transmission 110 may include components that cooperate to efficiently transmit energy from power source 105 to traction devices 120. Transmission 110 may include a plurality of pumps 125 for providing power to a plurality of motors 130. Transmission 110 may also include a plurality of sprockets 135 that are driven by motors 130 and a bridge assembly 140 on which components of transmission 110 may be mounted. Transmission 110 may further include a driveshaft assembly 145 that may either directly or indirectly drive pumps 125. Transmission 110 may additionally include a pump (not shown) such as, for example, a fixed-displacement pump that may be driven by driveshaft assembly 145 to provide hydraulic power for work tools such as, for example, buckets, forks, blades, and hammers. Transmission 110 may also include a charge pump (not shown) such as, for example, a fixed-displacement pump that may be driven by driveshaft assembly 145 to supply makeup fluid to pumps 125.

Each pump 125 may be any pump suitable for providing power to motors 130 such as, for example, a variable-displacement pump. For example, pump 125 may be a swashplate type pump and may include multiple piston bores and pistons held against a tiltable and rotatable swashplate. Pump 125 may be driven by driveshaft assembly 145 such that the swashplate is rotated and the pistons reciprocate within the piston bores to produce a pumping action. Alternatively, pump 125 may be a piston-type pump, an impeller-type pump, or any other suitable type of pump known in the art.

Each motor 130 may be any suitable motor for driving sprockets 135 such as, for example, a fixed or variable-displacement, bent-axis type hydraulic motor. Motor 130 may receive pressurized fluid from pump 125, causing motor 130 to rotate. The rotation of each motor 130 may cause associated sprockets 135 to rotate. Alternatively, motor 130 may be a linear hydraulic motor or hydraulic cylinder.

Bridge assembly 140 may be a pump-motor bridge that mechanically support pumps 125 and motors 130 such that these components are integrated into a single component. Bridge assembly 140 may include a common center section 150 to enable fluid connections between pumps 125, motors 130, and any other component of transmission 110. Components of bridge assembly 140 may be disposed in a back-to-back configuration. Rear portions 155 of pumps 125 may be disposed to face each other in a back-to-back configuration. Rear portions 160 of motors 130 may also be disposed to face each other in a back-to-back configuration. Bridge assembly 140, by facilitating fluid connections needed to operate transmission 110, may significantly reduce the need for hoses and fittings, thereby greatly reducing the opportunity for contamination or leaks. Bridge assembly 140 may also provide efficient access to service and diagnostic points of transmission 110 and reduce line and/or fitting pressure drop losses. Bridge assembly 140 may also form a dry sump (not shown) to collect excess fluid. Additional components such as, for example, filters may be mounted to bridge assembly 140.

To reduce leaks and contamination, components of bridge assembly 140 may be required to be arranged with precision. As a result, the dimensions of bridge assembly 140 may be substantially fixed, remaining substantially constant between machines 100. For example, a dimension 165 of bridge assembly 140 may remain substantially constant from one machine 100 to another machine 100. Dimension 165 may be measured between the back-to-back configuration of motors 130, which may be measured between front portions 170 of motors 130. Other dimensions of bridge assembly 140 such as, for example, a length between the back-to-back configuration of pumps 125 may also remain substantially constant from one machine 100 to another machine 100.

Frame 115 may be a structural support for mounting transmission 110, traction devices 120, and other components to machine 100. Frame 115 may include a plurality of chain boxes 175, a fixed coupling 180, and a variable coupling 185 (FIG. 2). One of the plurality of motors 130 of bridge assembly 140 may be mounted to one of the plurality of chain boxes 175 via fixed coupling 180. Another of the plurality of motors 130 of bridge assembly 140 may be mounted to another of the plurality of chain boxes 175 via variable coupling 185. Bridge assembly 140 may thereby be mounted between chain boxes 175 via fixed coupling 180 and variable coupling 185.

Figure 3:
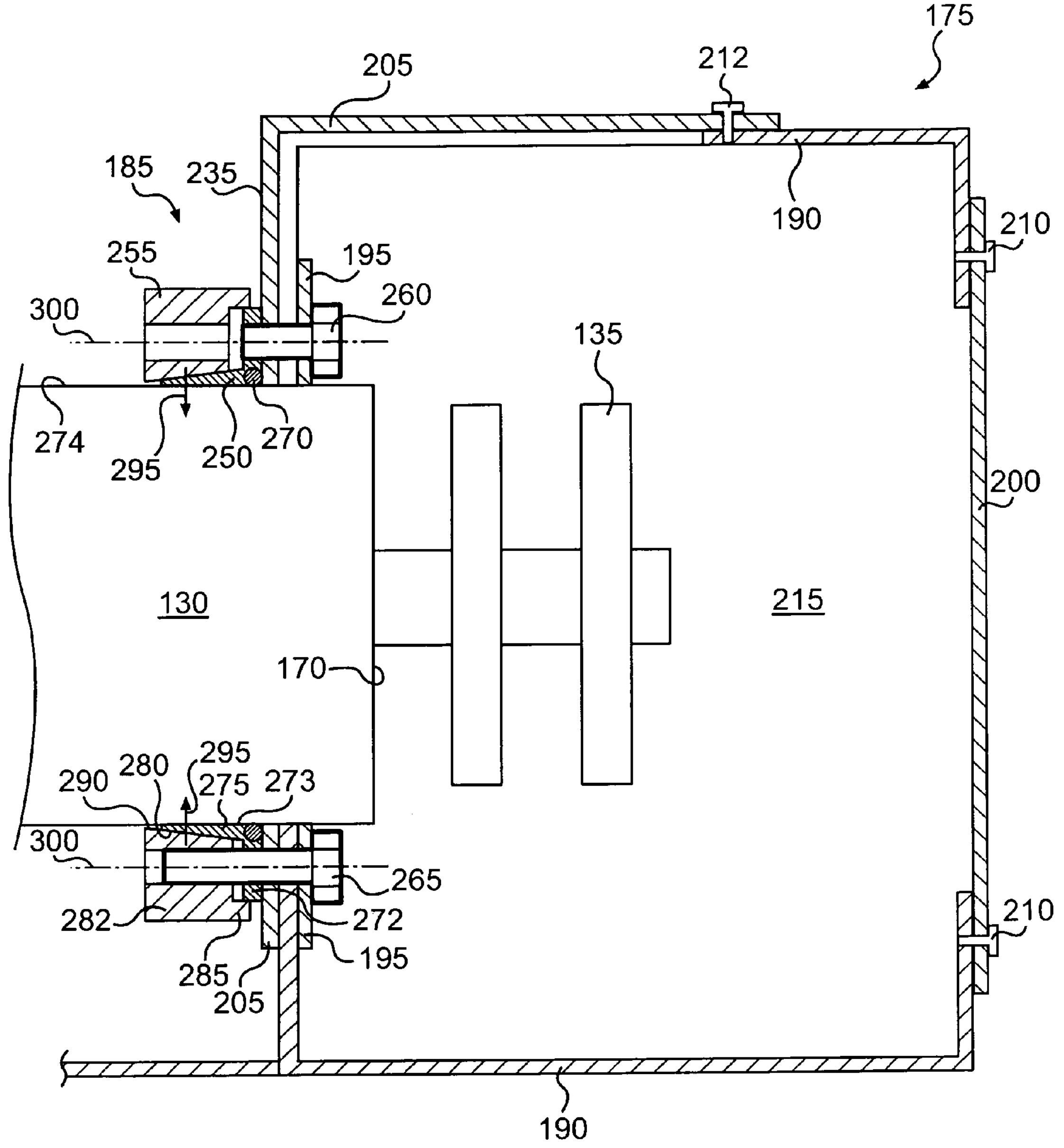
FIG. 3 is a schematic illustration of an exemplary disclosed coupling of the machine of FIGS. 1 and 2.

Chain boxes 175 may receive motors 130 and sprockets 135 and may house components that drive traction devices 120. As shown in FIG. 3, each chain box 175 may include a main plate 190, a spacer plate 195, a side plate 200, and a cover plate 205. Main plate 190, spacer plate 195, and cover plate 205 may include orifices that are sized large enough to receive motor 130. The orifice of main plate 190 may extend to a top portion of chain box 175 such that bridge assembly 140 may be lowered into chain box 175 without coming into contact with main plate 190. After motor 130 of bridge assembly 140 is lowered into chain box 175, cover plate 205 may be used to cover the top portion of chain box 175. Side plate 200 may be fastened to main plate 190 via fasteners 210, and cover plate 205 may be fastened to main plate 190 via fastener 212, thereby forming a chamber 215. Motor 130 may be mounted to main plate 190, spacer plate 195, cover plate 205, and any number of seals via coupling 180 or coupling 185. Chamber 215 may thereby be substantially sealed when motor 130 is mounted to chain box 175.

Referring back to FIG. 1, chain boxes 175 may include a plurality of chains 220 for driving traction devices 120. Chain boxes 175 may also include a plurality of sprockets 225 that may be attached to chain boxes 175 and disposed within chambers 215. Chains 220 may be looped between sprockets 135 and 225 such that motors 130 may drive sprockets 135 and 225 via chains 220. Chains 220 and sprockets 135 and 225 may be immersed in an oil bath within substantially sealed chambers 215 to maintain lubrication of these components.

A dimension 230 may be measured between inside walls 235 of chain boxes 175. Dimension 230 between chain boxes 175 may vary from one machine 100 to another machine 100 because of differences in manufacturing. Relatively large dimensional tolerances may be allowed in manufacturing frame 115, compared to relatively small dimensional tolerances that may be allowed in manufacturing transmission 110. As a result, dimension 230 may vary significantly from one machine 100 to another machine 100, as compared to the relatively small variance of dimension 165 of transmission 110. For example, dimension 230 may vary ±3 mm between machines 100. Dimension 165 may thereby have a different length than dimension 230.

As noted above, fixed coupling 180 may attach one of the plurality of motors 130 directly to one of the plurality of chain boxes 175. Fixed coupling 180 may be any suitable device for making a fixed connection between motor 130 and chain box 175 such as, for example, the arrangement shown in FIG. 2. Fixed coupling 180 may attach motor 130 to chain box 175 such that substantially no movement is allowed between motor 130 and chain box 175. For example, fixed coupling 180 may include a flange 240 and a plurality of fasteners 245 such as, for example, bolts. Flange 240 may be attached to motor 130 by any suitable technique in the art such as, for example, welding or bolting. Flange 240, as well as main plate 190, spacer plate 195, and cover plate 205 of chain box 175 may include orifices configured to receive fasteners 245. Flange 240 may thereby be attached to chain box 175 via fasteners 245. Fixed coupling 180 may include additional components such as, for example, spacer plates and seals.

Variable coupling 185 may also attach one of the plurality of motors 130 to one of the plurality of chain boxes 175. Variable coupling 185 may be any suitable mounting device that allows for dimensional differences between bridge assembly 140 and frame 115 (i.e., allows for a difference between dimension 165 and dimension 230) by making a variable connection. For example, variable coupling 185 may include a compression sleeve arrangement as illustrated in FIG. 3.

The variable coupling 185 in the form of a compression sleeve arrangement may include an inner ring 250, an outer ring 255, a plurality of fasteners 260, a plurality of fasteners 265, and at least one seal 270. Inner ring 250 and outer ring 255 may include a plurality of orifices circumferentially spaced around rings 250 and 255 and configured to receive fasteners 260 and 265. Fasteners 260 and 265 may be placed circumferentially around variable coupling 185 in an alternating pattern (e.g., every other fastener may be fastener 260, with the remaining fasteners being fasteners 265, as one example). The orifices of inner ring 250 and outer ring 255 may include threading and may threadably receive fasteners 260 and 265, which may be threaded bolts. Main plate 190, spacer plate 195, and cover plate 205 may also include a plurality of orifices configured to receive fasteners 260 and 265. The orifices of main plate 190, spacer plate 195, cover plate 205, inner ring 250, and outer ring 255 may be coaxially aligned.

Fasteners 265 may have a greater length than fasteners 260. Fasteners 260 may have a length sufficient to extend through spacer plate 195, main plate 190, cover plate 205, and inner ring 250, but not through outer ring 255. Fasteners 260 may thereby attach inner ring 250 to chain box 175. Fasteners 265 may be longer than fasteners 260, such that fasteners 265 may extend through spacer plate 195, main plate 190, cover plate 205, inner ring 250, and outer ring 255. Fasteners 265 may thereby attach outer ring 255 to inner ring 250. It is also contemplated that fasteners 260 may have a length generally matching fasteners 265.

Inner ring 250 may include a base portion 272 in which the orifices for receiving fasteners 260 and 265 are disposed. Inner ring 250 may include an inside diameter face 273 that is sized to be slightly larger than an outside diameter face 274 of motor 130. Motor 130 may thereby be inserted through inner ring 250. Inner ring 250 may also include a protruding portion 275 that protrudes from base portion 272. Inner ring 250 may include a sloped surface 280 located on an outside diameter face of protruding portion 275. Fasteners 260 may be threaded through the orifices of main plate 190, spacer plate 195, cover plate 205, and inner ring 250 such that base portion 272 of inner ring 250 is securely fastened to chain box 175. Inner ring 250 may be attached to chain box 175 such that substantially no movement is allowed between inner ring 250 and chain box 175. Fasteners 260 may have a length such that an end of each fastener 260 does not protrude from the orifice of inner ring 250 when inner ring 250 is fastened to chain box 175. Seal 270 may be disposed between base portion 272 and cover plate 205 and may make a sealed connection between inner ring 250 and chain box 175.

Outer ring 255 may include a base portion 282 in which orifices for receiving fasteners 265 are disposed. An inside diameter of base portion 282 of outer ring 255 may be slightly larger than an outside diameter of protruding portion 275 of inner ring 250. Outer ring 255 may also include a protruding portion 285 that protrudes from base portion 282. Outer ring 255 may include a sloped surface 290 located on an inside diameter face of base portion 282. Fasteners 265 may be threaded through the orifices of main plate 190, spacer plate 195, cover plate 205, inner ring 250, and outer ring 255 such that outer ring 255 is secured to inner ring 250. As fasteners 265 are threaded, sloped surface 280 of inner ring 250 may contact sloped surface 290 of outer ring 255. Sloped surfaces 280 and 290 may be configured to be flush when fastener 265 is threaded. As fasteners 265 are threaded further through the orifices of outer ring 255, outer ring 255 may exert a force 295 against inner ring 250 via the contacting sloped surfaces 280 and 290. Force 295 may be applied in a direction that is perpendicular to a threading axis 300 (i.e., toward motor 130). Force 295 may cause inside diameter face 273 of inner ring 250 to compress around motor 130, gripping outside diameter face 274 of motor 130. A sealed connection may thereby be formed between inner ring 250 and motor 130.

Referring back to FIG. 1, traction devices 120 may be located on at least one side of machine 100 and may transfer a traction force to the ground to propel machine 100. Traction devices 120 may be any suitable device for applying traction such as, for example, wheels or tracks. Mechanical power may be transferred to traction devices 120 from power source 105 via transmission 110. Traction devices 120 may be attached to sprockets 225 via a plurality of axles 310. Motors 130 may drive sprockets 225 via chains 220, thereby driving axles 310 and traction devices 120 to propel machine 100. Traction devices 120 may include additional components such as, for example, wheels, hubs, tracks, and belts.

INDUSTRIAL APPLICABILITY

The disclosed mounting method may be used in any machine having components that require mounting. For example, the method may be particularly applicable to machines having mounted hydraulic components such as, for example, skid steer loaders.

Figure 4:
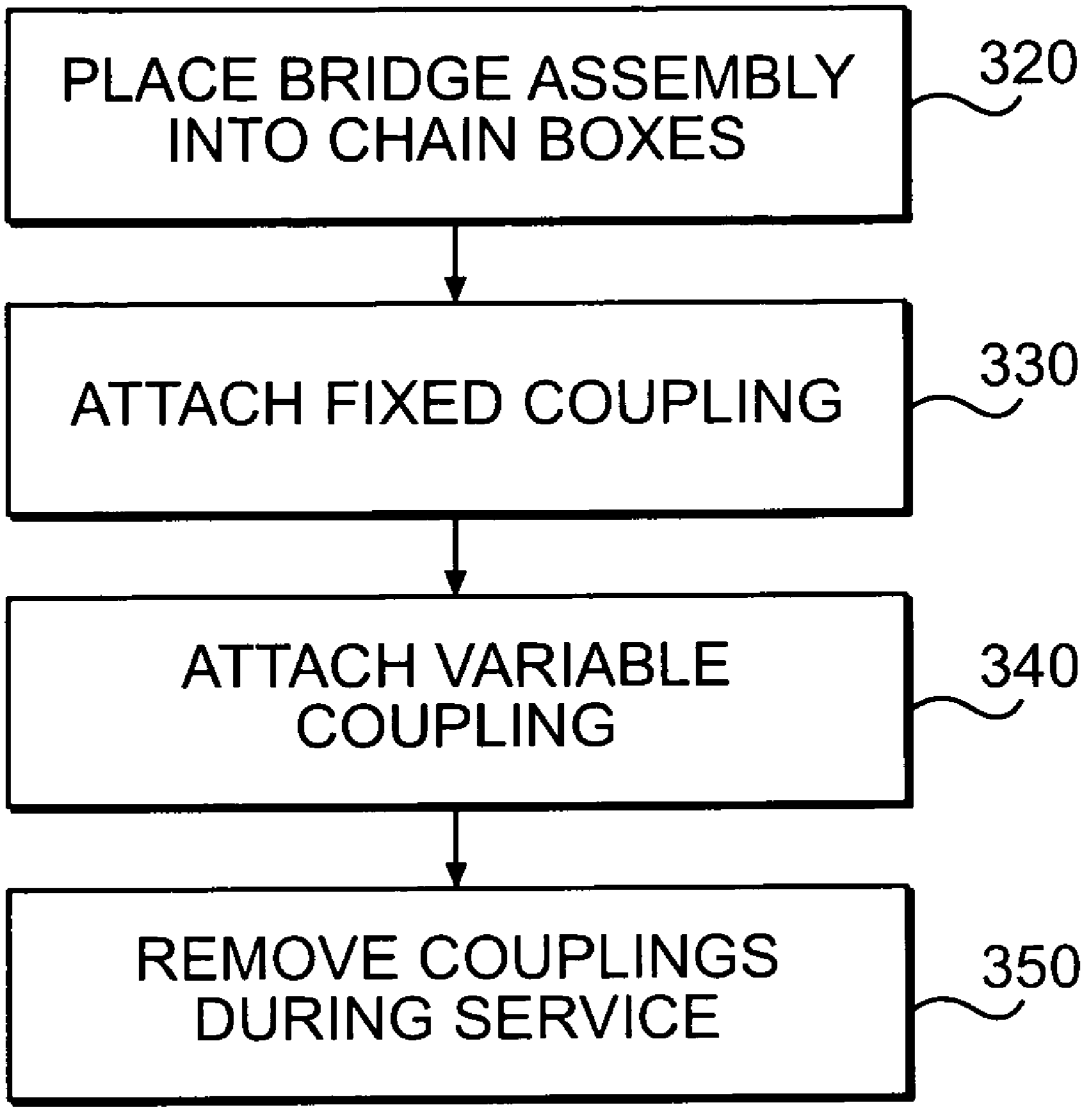
FIG. 4 is a flow chart of an exemplary disclosed mounting method.

FIG. 4 illustrates a mounting method. In step 320, bridge assembly 140 may be placed in frame 115 via the orifices located at the top portions of chain boxes 175. First motor 130 disposed on the first side of bridge assembly 140 may be received in chamber 215 of first chain box 175, and second motor 130 disposed on the second side of bridge assembly 140 may be received in second chain box 175. As bridge assembly 140 is placed into frame 115, flange 240 of fixed coupling 180 may already be attached to first motor 130 and inner ring 250 and outer ring 255 of variable coupling 185 may already be placed loosely around outside diameter face 274 of second motor 130. Spacer plates 195 and cover plates 205 may also already be placed loosely around motors 130 as bridge assembly 140 is placed into frame 115.

In step 330, first motor 130 may be attached to first chain box 175 via fixed coupling 180, as shown in FIG. 2. As fasteners 245 are inserted into flange 240 of fixed coupling 180 to fasten the first side of bridge assembly 140 to first chain box 175, the second side of bridge assembly 140 may be free to displace. Specifically, as first motor 130 on the first side of bridge assembly 140 is fastened via fixed coupling 180, second motor 130 on the second side of bridge assembly 140 may be free to displace back and forth within inner ring 250 and outer ring 255 of variable coupling 185, and the orifices of main plate 190, spacer plate 195, and cover plate 205, in the direction of axis 300. Because the second side of bridge assembly 140 is free to displace, the first side of bridge assembly 140 may be attached to first chain box 175 without causing distortion of frame 115. Fasteners 245 may be tightened to seal first chain box 175.

In step 340, second motor 130 may be attached to second chain box 175 via variable coupling 185. Fasteners 260 may be inserted through some (e.g., every other orifice, or any other suitable pattern) of the aligned orifices of main plate 190, spacer plate 195, cover plate 205, and inner ring 250 and tightened, thereby fastening and sealing inner ring 250 to chain box 175. Fasteners 265 may be inserted through the remaining aligned orifices of main plate 190, spacer plate 195, cover plate 205, inner ring 250, and outer ring 255. Fasteners 265 may be tightened, causing outer ring 255 to be drawn toward inner ring 250. As outer ring 255 is drawn toward inner ring 250, sloped surface 280 of inner ring 250 may contact sloped surface 290 of outer ring 255. As outer ring 255 is drawn increasingly closer to inner ring 250, sloped surface 290 of outer ring 255 may ride up sloped surface 280 of inner ring 250, causing the inside diameter face of outer ring 255 to be tightly pressed around the outside diameter face of inner ring 250, thereby developing force 295. Force 295 may press inside diameter face 273 of inner ring 250 against outside diameter face 274 of motor 130, causing inner ring 250 to grip motor 130. Fasteners 265 may be tightened until a fixed connection is formed between inner ring 250 and motor 130. Because the second side of bridge assembly 140 was already adjusted in step 330, prior to the installation of variable coupling 185, the second side of bridge assembly 140 may be attached to first chain box 175 without causing distortion of frame 115. Mounting bridge assembly 140 via variable coupling 185 may thereby allow for dimensional differences between dimension 165 of bridge assembly 140 and dimension 230 of frame 115. It is also contemplated that step 340 may precede step 330.

Step 350 may be performed when transmission 110 requires service or maintenance. On the second side of bridge assembly 140, fasteners 265 may be removed from variable coupling 185. A device such as, for example, a jack screw or other jacking device may then be used to separate outer ring 255 from inner ring 250. The jack screw may move outer ring 255 away from inner ring 250 such that sloped surface 290 of outer ring 255 slides down sloped surface 280 of inner ring 250. As the jack screw jacks outer ring 255 away from inner ring 250, force 295 may decrease in magnitude, causing inner ring 250 to release its grip on motor 130, thereby uncoupling the fixed connection between inner ring 250 and second motor 130. Fasteners 260 may be removed such that inner ring 250 may be detached from second chain box 175. On the first side of bridge assembly 140, fasteners 245 may be removed from fixed coupling 180 such that first motor 130 is detached from first chain box 175. If required, bridge assembly 140 may be removed from frame 115 and any required service or maintenance may be performed. Bridge assembly 140 may then be installed again into machine 100 according to steps 320, 330, and 340.

The disclosed mounting method may be used to mount bridge assembly 140 having substantially constant dimension 165 to frame 115 having variable dimension 230. It is also contemplated that the disclosed mounting method may be used to mount bridge assembly 140 having a variable dimension 165 to frame 115 having a substantially constant dimension 230. Variable coupling 185 may adjustably attach bridge assembly 140 to frame 115, allowing for dimensional differences between bridge assembly 140 and frame 115. By allowing for dimensional differences between bridge assembly 140 and frame 115, mounting may be made more efficient and a required amount of installation time may be reduced. Additionally, variable coupling 185 may reduce structural deformation caused by dimensional differences, thereby reducing undesired distortion of frame 115.

It will be apparent to those skilled in the art that various modifications and variations can be made to the disclosed method and apparatus. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A mounting method for a skid steer loader, comprising:
coupling a first end portion of a component directly to a first wall of a skid steer loader frame; and
coupling a second end portion of the component to an opposite wall of the skid steer loader frame by a mounting system that allows for dimensional differences between the component and the skid steer loader frame, wherein coupling the second end portion includes making a variable connection between the second end portion and the opposite wall, wherein making the variable connection includes inserting the second end portion through a first ring having a sloped surface and a second ring having a sloped surface, the second end portion being free to displace through the first and second rings during the coupling of the first end portion.

2. The method of claim 1, wherein directly coupling the first end portion includes making a fixed connection that allows substantially no movement between the first end portion and the first wall.

3. The method of claim 2, wherein making the fixed connection includes attaching a flange of the first end portion to the first wall.

4. The method of claim 1, wherein the second end portion is free to displace through the first and second rings when the first end portion is coupled to the first wall of the skid steer loader frame.

5. The method of claim 4, further including fastening the first ring to the opposite wall.

6. The method of claim 5, further including drawing the second ring closer to the first ring such that the sloped surface of the second ring rides up the sloped surface of the first ring.

7. The method of claim 6, wherein the sloped surface of the second ring riding up the sloped surface of the first ring causes the first ring to grip the second end portion of the component to make a fixed connection.

8. The method of claim 7, further including pushing the second ring away from the first ring via jacking to uncouple the fixed connection.

9. The method of claim 1, wherein the component is a pump-motor bridge.

10. The method of claim 9, wherein the pump-motor is hydraulic.

11. The method of claim 1, wherein the first wall is related to a first chain box, and the second wall is related to a second chain box.

12. A mounting method for a skid steer loader, comprising:
coupling a first end portion of a pump-motor bridge directly to a first chain box of a skid steer loader frame; and
coupling a second end portion of the pump-motor bridge to a second chain box of the skid steer loader frame by a compression sleeve that allows for dimensional differences between the pump-motor bridge and the skid steer loader frame, wherein the compression sleeve grips the second end portion when a sloped surface of a first ring of the compression sleeve is drawn up a sloped surface of a second ring of the compression sleeve.

13. The method of claim 12, wherein the second end portion is a portion of a hydraulic motor.

14. The method of claim 12, further including fastening the first ring to a wall.

15. The method of claim 12, further including pushing the second ring away from the first ring via jacking.

16. The method of claim 12, further including tightening fasteners until a fixed connection is formed between at least one of the first or second ring and the second end portion.

17. A mounting method for a skid steer loader, comprising:
coupling a first end portion of a pump-motor directly to a first wall of a skid steer loader frame; and
coupling a second end portion of the pump-motor to an opposite wall of the skid steer loader frame by a mounting system that allows for dimensional differences between the pump-motor and the skid steer loader frame, wherein coupling the second end portion includes making a variable connection between the second end portion and the opposite wall, wherein making the variable connection includes inserting the second end portion through a first ring having a sloped surface and a second ring having a sloped surface, the second end portion being free to displace through the first and second rings during the coupling of the first end portion, wherein the second end portion is free to displace through the first and second rings when the first end portion is coupled to the first wall of the skid steer loader frame.

* * * * *